(No Model.)

J. K. STEWART.
MECHANISM FOR OPERATING ANIMAL SHEARS OR OTHER TOOLS.

No. 604,869. Patented May 31, 1898.

Witnesses.
E. T. Wray.
Jean Elliott.

Inventor,
John K. Stewart
by Burton and Burton
his Attys.

UNITED STATES PATENT OFFICE.

JOHN K. STEWART, OF CHICAGO, ILLINOIS.

MECHANISM FOR OPERATING ANIMAL-SHEARS OR OTHER TOOLS.

SPECIFICATION forming part of Letters Patent No. 604,869, dated May 31, 1898.

Application filed October 16, 1897. Serial No. 655,459. (No model.)

*To all whom it may concern:*

Be it known that I, JOHN K. STEWART, a citizen of the United States, residing at Chicago, county of Cook, and State of Illinois, have invented certain new and useful Improvements in Mechanism for Operating Animal-Shears or other Tools, which are fully set forth in the following specification, reference being had to the accompanying drawings, forming a part thereof.

This invention is an improvement in mechanism for operating animal-shears and other tools adapted to be directed by hand.

Figure 1:
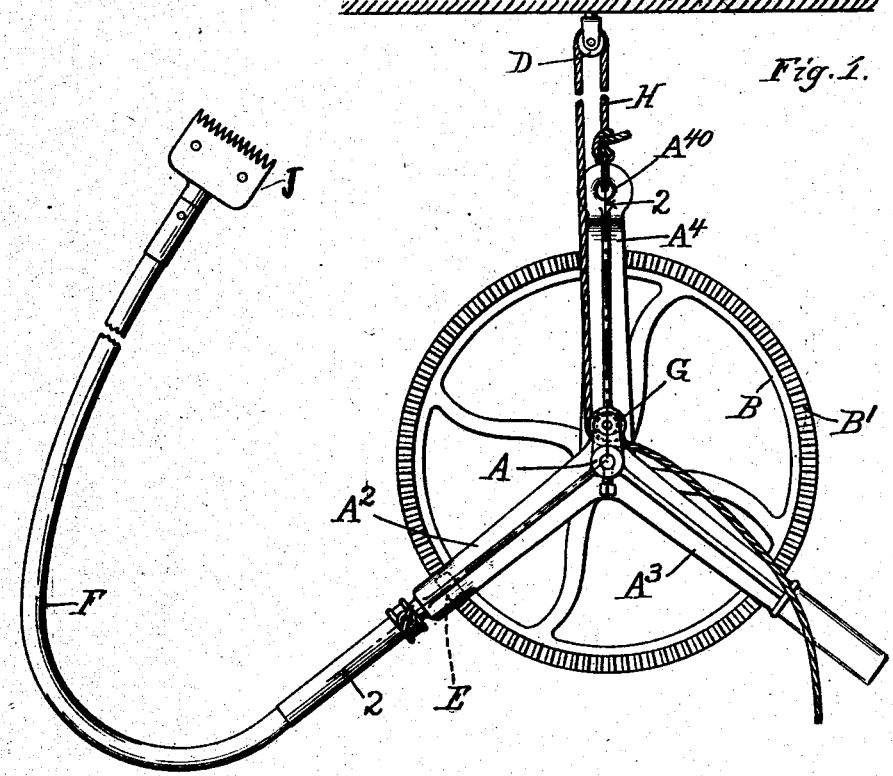
Figure 2:
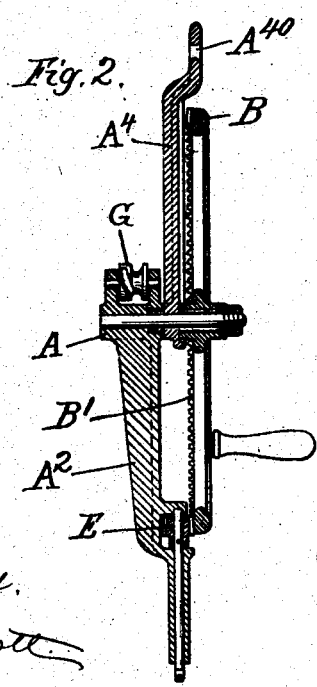

In the drawings, Figure 1 is a side elevation of my improved appliance. Fig. 2 is a section at the line 2 2 on Fig. 1.

My improvement consists in suspending the frame having the gearing-train by a cable from the ceiling and providing means for letting out and taking up the cable to vary the height and adapting the frame in other ways to be held by the operator, who operates it by hand, dispensing entirely with the standard and reducing the frame in compass to the dimensions which are merely necessary to properly separate journal-bearings of the gear-wheels.

I construct my device with a frame which consists of a hub A, having two radial arms $A^2$ $A^3$ about one hundred and twenty degrees apart, a drive-wheel B being journaled at the hub and the arms being long enough to extend each somewhat beyond the periphery of the drive-wheel, which in practice need not exceed twenty-four inches in diameter, making the arms from twelve to eighteen inches in length. Upon the opposite side of the hub from that at which these two arms project I locate means for securing a suspending-cable. Preferably such cable runs over a pulley D at the ceiling and requires two points of connection with the frame, one of them being a permanent or fixed connection for the end of the cable H and the other being a slip connection or guide at which the cable may be gripped and released at the will of the operator, consisting of a grip pulley or roller G of construction familiar for such purpose, so that the device may be raised or lowered at will. When this is provided for, I make the connection above mentioned near the hub serve for the slipping and gripping connection, and I provide a third arm $A^4$, pivoted at the hub and extending beyond the periphery of the wheel and provided with an eye $A^{40}$ for attaching the cable. The arm $A^2$ has a bearing for a pinion E, which is the immediate means of driving the flexible tool-actuating shaft F and which meshes with and is driven by a gear-face B' on the drive-wheel, which is journaled at the hub A. The other fixed arm $A^3$ serves as a handle by which the operator may move and direct the machine with the left hand while rotating the drive-wheel with the right.

J is a tool actuated by the flexible shaft F. I have illustrated in this instance a clipper. Any other tool adapted to be driven by a rotating shaft may be similarly attached.

The essential characteristic of this invention consists of the frame or spider, which has the bearings of the wheels (of whatever number) of the train for driving a flexible shaft, and suitable means for flexibly suspending the frame, the latter having a handle for directing and controlling its position when suspended.

A specific feature of this structure which contributes to its utility is the employment of the arm pivoted at the hub or center of the frame and adapted to afford fixed connection for one end of a suspending-cable, a second slip-and-grip connection for the cable being provided at a point nearer the hub than the end of the pivoted arm, so that the weight of the device tends to draw the two points of suspension into line, and thus tends to cause the device to assume a preferred position, while its position can be controlled readily by the handle, by means of which the frame, consisting of the hub and two rigid arms, may be rocked at the pivotal connection of the pivoted arm, which constitutes the suspending-arm.

It will be understood that the machine is designed to be operated by one person, while another handles the clipper, brush, or other tool which is driven by it. The operator hereinabove referred to is the person who operates the mechanism and not the person who handles the tool.

I claim—

1. In an appliance for operating animal-shears and other tools, a frame or spider, and means for suspending it flexibly, such frame comprising a rigid handle; a drive-wheel and a driven wheel both mounted on the frame; and a tool-actuating flexible shaft operatively connected with the driven wheel.

2. In an appliance for driving and operating animal-shears or other tools, a frame, a driving and a driven wheel journaled therein; a cable by which the frame is flexibly suspended, such cable extending from the frame over a supporting sheave-pulley, and thence back to the frame, and suitably secured thereto at two points, and a slip-and-grip device at one of said points to permit adjustment, all combined and operating substantially as set forth.

3. In an appliance for operating animal-shears or other tools, in combination with the spider having arms A³ and A⁴ radiating from the central hub; and a driving-wheel journaled at the hub; one of said arms having means for suspending the frame; the other of said arms extending in a position to serve as a directing-handle, and a third arm having bearings for a pinion, a pinion journaled in said arm actuated by the centrally-journaled wheel, and a flexible shaft operatively connected with and actuated by said pinion and adapted to carry the tool at the remote end.

4. In combination with the frame consisting of a hub having two radial arms, the driving-wheel journaled at the hub-center; a pinion journaled on one of the arms and driven by the drive-wheel, and the flexible shaft operatively connected with and driven by the pinion, the other arm being adapted to serve as a directing-handle for the frame, and a third radial arm pivoted about the hub-center, and a suspending-cable attached to such arm at a point remote from the center, the frame being provided with another point of attachment for the cable near the hub-center.

5. In combination with the frame consisting of a hub having two rigid radial arms, the drive-wheel journaled at the hub-center; a pinion journaled on one of the arms and driven by the drive-wheel, and the flexible shaft operatively connected with and driven by the pinion, the other arm being adapted to serve as a directing-handle for the frame, and a third radial arm pivoted about the hub-center and a suspending-cable attached to such arm at a point remote from the center, the frame being provided with another point of attachment for the cable near the hub-center, the attachment at one of said points being made by a slip-and-grip device engaging the cable.

6. In combination with the frame consisting of a hub having two rigid radial arms, the drive-wheel journaled at the hub-center, a pinion journaled on one of the arms and driven by the drive-wheel and the flexible shaft operatively connected with and driven by the pinion; the other arm being adapted to serve as a directing-handle for the frame, and a third radial arm pivoted about the hub-center and a suspending-cable attached to such arm at a point remote from the center, the frame being provided with a slip-and-grip device for engaging the cable at a second point of attachment near the center on the side opposite that from which the rigid arms project.

In testimony whereof I have hereunto set my hand, in the presence of two witnesses, at Chicago, Illinois, this 11th day of October, 1897.

JOHN K. STEWART.

Witnesses:
L. E. SCHNEIDER,
S. A. STOKES.